United States Patent
Rohner (10) Patent No.: US 10,634,788 B2
(45) Date of Patent: Apr. 28, 2020

(54) DUAL-BEAM FMCW DISTANCE MEASURING METHOD HAVING COMPENSATION OF A VELOCITY-DEPENDENT DISTANCE MEASUREMENT ERROR

(71) Applicant: HEXAGON TECHNOLOGY CENTER GMBH, Heerbrugg (CH)

(72) Inventor: Marcel Rohner, Heiden (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

(21) Appl. No.: 16/436,800

(22) Filed: Jun. 10, 2019

(65) Prior Publication Data

US 2019/0377089 A1  Dec. 12, 2019

(30) Foreign Application Priority Data

Jun. 11, 2018  (EP) .................................. 18177135

(51) Int. Cl.
*G01S 17/32* (2020.01)
*G01S 7/4911* (2020.01)
*G01S 7/4915* (2020.01)

(52) U.S. Cl.
CPC ............. *G01S 17/32* (2013.01); *G01S 7/4911* (2013.01); *G01S 7/4915* (2013.01)

(58) Field of Classification Search
CPC ................................ G01S 17/08; G01S 17/34
See application file for complete search history.

(56) References Cited

U.S. PATENT DOCUMENTS

| 5,920,280 A | * | 7/1999 | Okada ................... G01S 13/345 342/109 |
|---|---|---|---|
| 9,030,670 B2 | | 5/2015 | Warden et al. |
| 2010/0321668 A1 | | 12/2010 | Ueno |
| 2011/0051146 A1 | | 3/2011 | Jensen et al. |
| 2011/0205523 A1 | | 8/2011 | Rezk et al. |

(Continued)

FOREIGN PATENT DOCUMENTS

| FR | 2 965 064 A1 | 3/2012 |
| JP | H09-257415 A | 10/1997 |
| WO | 2012038662 A1 | 3/2012 |

OTHER PUBLICATIONS

European Search Report dated Dec. 5, 2018 as received in Application No. 18177135.3.

*Primary Examiner* — Jonathan M Hansen
(74) *Attorney, Agent, or Firm* — Maschoff Brennan (57) ABSTRACT

A distance measuring method and a distance meter for a distance measurement according to the principle of a frequency-modulated continuous wave radar, wherein at least a part of a first laser radiation, which comprises a first frequency modulation defining a first modulation band, and at least a part of a second laser radiation, which comprises a second frequency modulation defining a second modulation band, are emitted as the first or as the second emission radiation, respectively, to a target. A parameter is determined, which is indicative of a frequency offset between the first and the second modulation band, and the parameter is taken into consideration during the determination of the at least one distance to the target to derive a frequency difference between the first frequency modulation and the second frequency modulation.

15 Claims, 4 Drawing Sheets

(56) References Cited

U.S. PATENT DOCUMENTS

| | | | |
|---|---|---|---|
| 2012/0146835 A1* | 6/2012 | Gross | G01S 7/35 342/109 |
| 2017/0146335 A1 | 5/2017 | Martinez et al. | |
| 2018/0224548 A1* | 8/2018 | Hariyama | G01S 7/4911 |
| 2019/0204441 A1* | 7/2019 | Feneyrou | G01S 17/58 |
| 2019/0331797 A1* | 10/2019 | Singer | G01S 7/497 |

* cited by examiner

DUAL-BEAM FMCW DISTANCE MEASURING METHOD HAVING COMPENSATION OF A VELOCITY-DEPENDENT DISTANCE MEASUREMENT ERROR

CROSS-REFERENCE TO RELATED APPLICATIONS

This application claims priority to European Patent Application No. 18177135.3, filed on Jun. 11, 2018. The foregoing patent application is herein incorporated by reference.

FIELD OF INVENTION

The invention relates to a distance measuring method for a distance measurement according to the principle of a frequency-modulated continuous wave radar.

BACKGROUND

Various principles and methods are known in the field of electronic distance measurement. One approach is to emit frequency-modulated electromagnetic radiation as an emission signal toward the target to be measured and subsequently to receive at least a part of the radiation returning from the target as a reception signal, also called an echo or echo signal. The target to be measured can comprise in this case both reflective backscattering characteristic, for example, if retroreflectors are used, and also diffuse backscattering characteristic.

After the reception, the echo signal is overlaid with a local oscillator signal to generate a beat signal, wherein the beat signal has a beat frequency correlating with the time-of-flight of the emission signal. The distance to the target may then be derived on the basis of the beat frequency.

The mixing/overlay is primarily used to transform the reception signal toward lower frequencies and amplify it, whereby the time-of-flight and thus—with known propagation speed of the radiation used—the distance to the target to be measured can be determined.

So-called FMCW distance meters (FMCW: "frequency-modulated continuous wave" radar), also called frequency-modulated continuous wave radar devices or FMCW radar devices, enable an absolute distance measurement to a target to be measured.

A tunable laser source is used in an FMCW arrangement. In the embodiment which is simplest in principle, in this case the tuning of the optical frequency of the laser source is performed linearly and at a known tuning rate, wherein the absolute wavelength of the emission signal thus generated is only known up to a certain degree, however. The reception signal is overlaid with a second signal, which is derived from the emitted emission signal. The resulting beat frequency of the mixed product, the interferogram, is a measure of the distance to the target.

Diverse refinements of this fundamental embodiment are known in the prior art, for example a use of a reference interferometer to measure the tuning behavior of the laser.

The distance measuring devices employed for implementing these methods typically use a signal generator, by means of which a signal, for example, a rising or falling frequency ramp, is applied to a radiation source which can be modulated. Lasers which can be modulated are typically used as radiation sources in the optical field. Emission and reception optical units are used for emission and reception in the optical field, from which a detector or quadrature detector for heterodyne mixing, A/D converter, and digital signal processor are connected downstream.

The change of the frequency of the emitted emission signal represents the scale of the measurement. Depending on the accuracy requirement for the distance measurement, this scale can be verified or determined more accurately by means of an additional measurement. Adequately linear tuning of the laser source often requires additional effort, for example. For this purpose, for example, a part of the emitted radiation is guided via a reference interferometer having defined reference length. The frequency change over time of the emitted emission signal can be concluded from the resulting beat product on the basis of the known reference length. If the reference length is unknown or unstable, for example because of temperature influences, it can thus be determined via an additional calibration unit, for example, a gas cell or a Fabry-Perot element.

In the most favorable case, the target is a target resting in relation to the distance meter, i.e., a target which has an unchanging distance over time in relation to the distance meter. However, absolute distance measurements can also be carried out on moving or vibrating targets with suitable compensation measures.

A radial movement of the target in relation to the distance meter results in a Doppler shift of the reception frequency because of the Doppler effect. The Doppler shift can be compensated for, however, by a combined measurement by means of successive rising and falling frequency ramps, for example, since the Doppler shift is equal for both ramps in the case of a constant radial velocity of the target, wherein the beat frequencies generated by the two ramps have different signs, however.

The usable measurement rate is also halved by the use of chronologically successive opposing ramps, however, i.e., with successive variations of the chirp sign. Moreover, this approach is based on a constant relative target velocity being provided during the cycle time for the two ramps. This assumption of a constant relative velocity of the target in relation to the distance meter is often inaccurate in practice, however, wherein accelerations and/or vibrations of the target during the measuring procedure, speckle effects, or other effects result in non-negligible measurement fluctuations in the distance measurement.

To remedy these problems, for example, two simultaneous and opposing frequency ramps are used in the prior art, i.e., wherein radiation is emitted having two radiation components, wherein the frequency of a first radiation component is tuned "upward", i.e., toward higher frequencies, and simultaneously the frequency of a second radiation component is tuned "downward", i.e. toward lower frequencies. The requirement for a constant relative radial velocity of the target is thus limited to a short time window. Moreover, for example, a reduction of the measurement rate is also avoided by such so-called opposing chirps.

To be able to metrologically separate the radiation components, various measures are known in the prior art, for example, polarization-based, spectral-based, or algorithmic separations.

BRIEF SUMMARY

It is an object of some embodiments of the present invention to provide an improved FMCW distance measuring method and a corresponding distance meter.

This object is achieved by the implementation of the characterizing features of the independent claims. Features which refine the invention in an alternative or advantageous manner can be inferred from the dependent patent claims.

Some embodiments of the invention relate to a distance measuring method having the following steps: generating a first and a second laser radiation, wherein the first laser radiation comprises a first frequency modulation defining a first modulation band and the second laser radiation comprises a second frequency modulation defining a second modulation band, wherein a gradient of the first frequency modulation is different from a gradient of the second frequency modulation in at least some time intervals (i.e., wherein in each case a time interval of the first frequency modulation for an FMCW analysis (FMCW: frequency-modulated continuous wave radar) corresponds to a time interval of the second frequency modulation, in particular is simultaneous, and the first or second frequency modulation in these respective time intervals each comprise different gradients corresponding to one another for the FMCW analysis); simultaneously emitting at least a part of the first laser radiation and at least a part of the second laser radiation as the first or as the second emission radiation, respectively, toward the target; receiving at least a part of the first emission radiation returning from the target and at least a part of the second emission radiation returning from the target as the first or as the second reception radiation, respectively; generating a first and a second mixed signal based on a mixture of the first reception radiation with a first local oscillator radiation or based on a mixture of the second reception radiation with a second local oscillator radiation, respectively, for a distance measurement according to the principle of a frequency-modulated continuous wave radar; and determining at least one distance to the target based on the first and the second mixed signal.

Typically, to carry out the distance measurement according to the principle of a frequency-modulated continuous wave radar, for example, at least a part of the first laser radiation or at least a part of the second laser radiation is respectively supplied to a local oscillator to generate the first or the second local oscillator radiation, respectively, i.e., the first and the second mixed signal each represent beat signals, the beat frequencies of which respectively correlate with the time-of-flight of the first or the second emission radiation.

Alternatively, however, the local oscillator radiations can also be generated by separate laser radiation sources.

The generation of the first and the second laser radiation can be carried out, for example, in such a way that the first and the second emission radiation are emitted as two separate emission beams to the target, or at least a part of the first laser radiation is overlaid with at least a part of the second laser radiation, so that the first and the second emission radiation are respectively emitted as a first and as a second beam component of a common overlaid beam. It is especially sufficient for carrying out the distance measuring method according to the invention if the common overlaid beam is configured in such a way that the reception frequencies associated with the first or the second beam component, respectively, can be algorithmically separated at the receiver. An optical separation is not necessary.

In particular, the first and the second mixed signal can furthermore be, for example, two separately generated signals or the first and the second mixed signal can be two different signal components of a common mixed signal, generated by a common mixture of parts of the first laser radiation, the second laser radiation, the first reception radiation, and the second reception radiation.

It is apparent that the distance measuring method can comprise further generic method steps from the prior art advantageous for a distance measurement according to the principle of a frequency-modulated continuous wave radar.

In particular, for example, the first and the second laser radiation are generated in such a way that the second frequency modulation comprises at least one time interval having a modulation direction opposing, in particular extending opposite to, the modulation direction of the first frequency modulation, in particular wherein the first and the second frequency modulation are generated according to a frequency-modulated continuous wave radar having opposing chirp.

According to some embodiments of the present invention, a parameter is furthermore determined, which is indicative of a frequency offset between the first and the second modulation band, and the parameter is taken into consideration during the determination of the at least one distance to the target to derive a frequency difference between the first frequency modulation and the second frequency modulation.

As already mentioned, the distance measurement in an FMCW distance meter is based on the change of the frequency of the emitted emission signal, while in contrast in the prior art, an accurate determination of the absolute frequency of the generated emission signal is typically omitted. Since the frequency variations are often small, to simplify the measurement analysis, the tacit assumption is typically made that the frequencies of, for example, opposing frequency ramps are identical. Strictly speaking, this assumption only results in no distance measurement error if the radial target velocity is equal to zero, however, while in contrast in the case of a non-negligible radial velocity not equal to zero, a distance measurement error occurs in each case which is dependent on presently set frequency values of the first and the second laser radiation, and/or on the curve of the tuned frequency values, and on the present radial velocity.

This so-called dynamic error can be compensated for by the invention, wherein the dynamic error can be reduced at the device in a first step by ensuring that the first and the second laser radiation have a fundamental frequency approximately equal to one another. In particular, the first and the second frequency modulation are modulated in relation to one another, for example, in such a way that the first and the second frequency modulation take place around a constant center frequency.

Furthermore, according to some embodiments of the invention, in particular a simplified estimation term can be used to compensate for the dynamic error, which is solely dependent on the frequency difference between the first and the second frequency modulation, wherein a determination of the absolute frequencies of the first and the second frequency modulation can be omitted.

According to one embodiment, the parameter which is indicative of a frequency offset between the first and the second modulation band is an intersection point in time, at which the first and the second laser radiation have the same frequency.

The intersection point in time can be determined, for example, from an interference curve of an overlay of at least a part of the first and at least a part of the second laser radiation. The two laser beams have the same frequency at an intersection point, wherein, for example, an interference signal from an overlay of local oscillators of the first and the second laser radiation has a strong interference deflection at the intersection point in time. The point in time of the occurrence of this interference deflection, also called interference point in time, can be determined using relatively simple means, for example, based on a threshold value for the interference signal strength of the interference curve.

For example, based on a defined measurement interval having a known time offset from the intersection point, an approximated value can be determined for the actual frequency difference between the first and the second frequency modulation at a point in time within the measurement interval, based on known parameters of the first and the second frequency modulation.

For example, the frequency difference between the first and the second frequency modulation is determined based on the parameter which is indicative of a frequency offset between the first and the second modulation band, and a first curve parameter with respect to the first frequency modulation and a second curve parameter with respect to the second frequency modulation, wherein in particular the first curve parameter is indicative of a gradient of the first frequency modulation and/or the second curve parameter is indicative of a gradient of the second frequency modulation.

In particular, the determination of the at least one distance is carried out during a measurement interval, wherein the measurement interval and the first and the second frequency modulation are adapted to one another in such a way that the first and the second emission radiation each comprise an essentially linear frequency modulation during the measurement interval.

Furthermore, according to a further embodiment, a referencing of the frequency curve of the first and/or the second frequency modulation is carried out with respect to a reference parameter of a reference interferometer, wherein non-linearities during the generation of the first and/or the second frequency modulation are compensated for based on the referencing during the determination of the at least one distance. Therefore, for example, the accuracy of the estimation of the approximated value for the actual frequency difference between the first and the second frequency modulation can be enhanced, by sufficiently linear tuning of the laser source being ensured, for example.

Some embodiments of the invention furthermore relate to a distance meter having a laser radiation source configured for generating a first and a second laser radiation, wherein the first laser radiation comprises a first frequency modulation defining a first modulation band and the second laser radiation comprises a second frequency modulation defining a second modulation band, and wherein a gradient of the first frequency modulation is different from a gradient of the second frequency modulation in at least some time intervals. Furthermore, the distance meter comprises: an emission path configured for simultaneous emission of at least a part of the first laser radiation and of at least a part of the second laser radiation as the first or as the second emission radiation, respectively, toward the target; a receiver configured for receiving at least a part of the first emission radiation returning from the target and at least a part of the second emission radiation returning from the target as the first or as the second reception radiation, respectively; a mixer configured for generating a first and a second mixed signal based on a mixture of the first reception radiation with a first local oscillator radiation or based on a mixture of the second reception radiation with a second local oscillator radiation, respectively, for a distance measurement according to the principle of a frequency-modulated continuous wave radar; and a processing unit configured for determining at least one distance to the target based on the first and the second mixed signal.

It is obvious that the distance meter can comprise further generic properties and components from the prior art advantageous for a distance measurement according to the principle of a frequency-modulated continuous wave radar. In particular, the first or the second local oscillator radiation can be respectively generated from the first or second laser radiation, wherein parts of the first or second laser radiation are each guided via a local oscillator route, or the local oscillator radiations can also be generated by separate laser radiation sources.

The laser radiation source and the emission path can be configured, for example, in such a way that the generation of the first and the second laser radiation is carried out in such a way that the first and the second emission radiation are emitted as two separate emission beams toward the target, or at least a part of the first laser radiation is overlaid with at least a part of the second laser radiation, so that the first and the second emission radiation are respectively emitted as a first or as a second beam component of a common overlaid beam. It is especially sufficient if the common overlaid beam is configured in such a way that the reception frequencies associated with the first or the second beam component can be algorithmically separated at the receiver.

Furthermore, the first and the second mixed signal can be, for example, two separately generated signals or the first and the second mixed signal can be two different signal components of a common mixed signal, generated by a common mixture of parts of the first laser radiation, the second laser radiation, the first reception radiation, and the second reception radiation.

According to some embodiments of the present invention, the processing unit is configured to determine a parameter which is indicative of a frequency offset between the first and the second modulation band, and to take the parameter into consideration during the determination of the at least one distance to the target to derive a frequency difference between the first frequency modulation and the second frequency modulation.

In particular, the distance meter according to the invention is configured to carry out the above-described distance measuring method.

The distance meter is especially configured according to one embodiment in that the second frequency modulation comprises at least one time interval having a modulation direction opposing, in particular extending opposite to, the modulation direction of the first frequency modulation.

In one embodiment, the parameter which is indicative of a frequency offset between the first and the second modulation band is an intersection point in time at which the first and the second frequency modulation have the same frequency.

For example, in a further embodiment, the distance meter has an interferometer arrangement for this purpose, which is configured to generate an interference curve of an overlay of at least a part of the first laser radiation and at least a part of the second laser radiation, and the processing unit is configured to determine the intersection point in time from the interference curve.

For example, a threshold value for the interference signal strength of the interference curve is stored, in particular is settable, on the processing unit, and the intersection point in time is determined based on the threshold value and the interference curve.

Under certain circumstances, it is sufficient if the time dependence of the frequencies of the first and the second laser radiation is derived from known component specifications and control signals of the distance meter, for example, based on a known activation of a signal generator of the distance meter to generate the first and the second frequency modulation.

For example, according to a further embodiment, a first curve parameter with respect to the first frequency modulation and a second curve parameter with respect to the second frequency modulation are stored on the processing unit, and the processing unit is configured to determine the frequency difference between the first and the second frequency modulation based on the parameter, which is indicative of a frequency offset between the first and the second modulation band, and also the first and the second curve parameter.

For example, the first curve parameter is indicative of a gradient of the first frequency modulation and/or the second curve parameter is indicative of a gradient of the second frequency modulation.

To increase the accuracy or for device monitoring, for example, to detect aging processes of the distance meter, however, additional arrangements for determining the first and the second frequency modulation can be installed in the distance meter.

For example, according to a further embodiment, the distance meter comprises a reference interferometer, which is configured to carry out a referencing of the frequency curve of the first and/or the second frequency modulation with respect to a reference parameter of the reference interferometer, wherein the processing unit is configured to compensate for nonlinearities during the generation of the first and/or the second frequency modulation based on the referencing during the determination of the at least one distance.

In a further embodiment, the distance meter is configured to determine a third curve parameter with respect to the first frequency modulation and a fourth curve parameter with respect to the second frequency modulation and to determine the frequency difference between the first and the second frequency modulation based on the parameter, which is indicative of a frequency offset between the first and the second modulation band, and also the third and the fourth curve parameter.

BRIEF DESCRIPTION OF THE DRAWINGS

The method according to the invention and the distance meter according to the invention are described in greater detail hereafter, solely by way of example, on the basis of exemplary embodiments schematically illustrated in the drawings. In the figures, the same elements are denoted by the same reference signs. The described embodiments are generally not shown to scale and they are also not to be understood as a restriction.

In the specific figures

DETAILED DESCRIPTION

Figure 1:
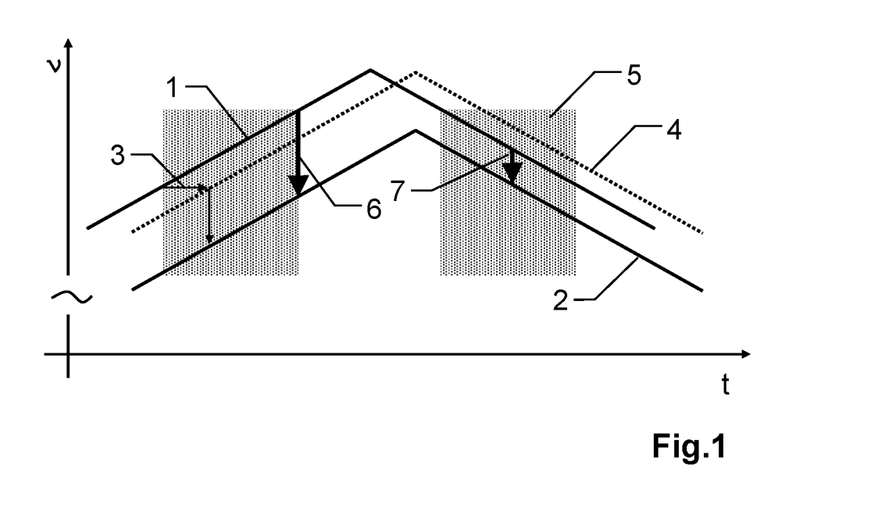
FIG. 1: shows an illustration of the chronological dependence of the emission and reception frequencies of a frequency-modulated continuous wave radar having rising and falling frequency ramps.

FIG. 1 schematically shows the chronological dependence of the frequency of the emission radiation 1 and the reception radiation 2 of a frequency-modulated continuous wave radar having rising and falling frequency ramps, also called an FMCW radar device, which enables an absolute distance measurement to a target to be measured.

Frequency-modulated electromagnetic radiation is emitted as an emission signal toward the target to be measured and subsequently at least a part of the radiation returning from the target is received as an echo signal. The target to be measured can comprise both reflective and also diffuse backscattering characteristics in this case. After the reception, the echo signal is overlaid, for example, with a local oscillator signal to generate an interferogram, wherein the time-of-flight of the emission signal and thus the distance to the target can be derived from the interferogram, for example, via a beat frequency correlating with the time-of-flight.

The radiation generated by the FMCW distance meter is frequency-modulated by a signal generator, so that, for example, rising and falling ramps result in the time curve t of the frequency v. A rising and a falling frequency ramp each having associated measurement ranges are typically used to compensate for Doppler effects, since with only a single, for example, rising frequency ramp, measured frequency changes of the beat frequency cannot be uniquely assigned to a distance contribution or a velocity contribution of the target or the distance meter.

The frequency of the emitter changes during the time-of-flight 3 of the emission signal to the target and back. Without consideration of the Doppler effect, a picture 4 of the frequency curve of the emission radiation shifted with time would thus result, while in contrast the picture 4 shifted with time is additionally shifted in the frequency direction in consideration of the Doppler effect. The distance measurement is performed with respect to the measurement ranges 5, also shown in the figure, for the rising and the falling frequency ramp, respectively.

Due to the use of a rising and a falling frequency ramp, for example, by means of a triangular frequency modulation as shown in the figure, the Doppler frequency as a measure of a relative radial velocity of the target can be determined as an independent measured variable in addition to the distance measurement.

For example, if the target moves radially away from the distance meter, according to one example, solely by way of example, the reception frequency 2 thus decreases by the Doppler frequency for the rising ramp and the differential frequency absolute value 6 of the rising ramp, i.e., the absolute value between the emission frequency 1 and the reception frequency 2 in the rising ramp, is increased, while in contrast the differential frequency absolute value 7 of the falling ramp decreases.

Since the frequency offset introduced by the Doppler effect, at constant radial velocity, is identical for the rising and the falling ramp, for example, with equal slope in absolute value of the frequency modulation in the rising and the falling ramp, the difference of the differential frequencies with respect to rising and falling ramps is a distance measure, independent of the radial velocity, while in contrast the mean value of the differential frequencies is a measure of the radial velocity of the target.

A chronological separation between the rising and the falling frequency ramp presumes, however, that the relative radial velocity of the target is constant during the distance measurement. However, this assumption is often not provided in practice and object vibrations, speckle effects, or other effects which interfere with the interferometric phase can result in non-negligible fluctuations of the measured distance.

Therefore, FMCW distance meters having so-called opposing chirp are often used in the prior art, i.e., wherein, for example, by means of two laser beams or two laser beam components, the rising and the falling frequency ramps are emitted essentially simultaneously. The presumption of a constant radial velocity then only still has to be fulfilled within a short time window.

Figure 2:
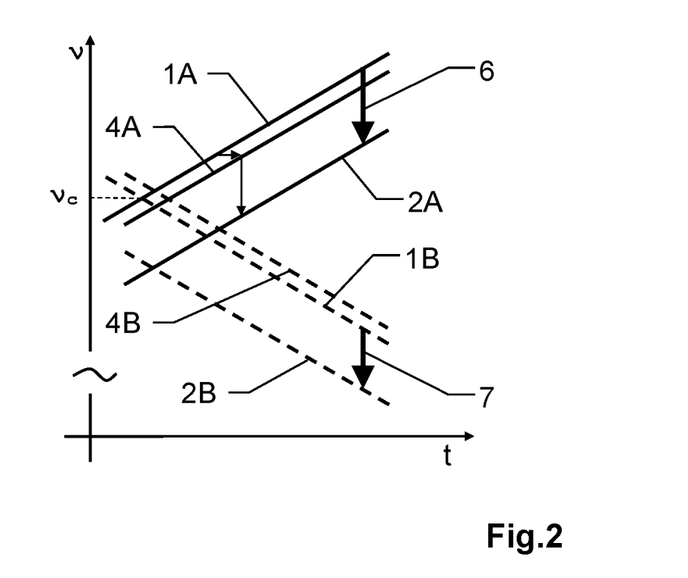
FIG. 2: shows the emission and reception frequencies of a frequency-modulated continuous wave radar having opposing chirp.

FIG. 2 schematically shows the emission and reception frequencies of a frequency-modulated continuous wave radar having opposing chirp. The radiation emitted toward a target has two radiation components in this case having different chronological variations of the frequency ν, i.e., opposing frequency ramps 1A, 1B.

For example, in this case the radiation components can be emitted as two overlapping laser beams having a phase offset of the opposing chirp of exactly 180°, i.e., strictly antiphase. The modulation depth of the two laser beams can be different. In particular, it is also possible not to modulate a source, corresponding to the combination of the frequency modulation method with a classical incremental interferometer. If both laser beams are emitted via a common optical unit toward a common target and/or received thereby, a separation into two reception frequencies 2A, 2B respectively associated with the opposing emission frequencies 1A, 1B thus has to be enabled at the receiver for analysis of the two laser beams, which is solved in the prior art, for example, algorithmically or by a different polarization of the laser beams.

To illustrate the FMCW principle and the Doppler shift, furthermore, similarly to FIG. 1, in addition to the Doppler-shifted reception frequencies 2A, 2B, the virtual pictures 4A, 4B, which are shifted in time, of the emission frequencies 1A, 1B modulated in opposite directions are in turn also shown in the figure without consideration of the Doppler effect.

Similarly to the use of sequential frequency ramps as shown in FIG. 1, with equal slope in absolute value of the frequency modulation in the rising and the falling ramps, the difference of the differential frequencies 6, 7 between emission and reception frequencies is a distance measure, independently of the radial velocity.

The difference of the modulation frequencies between the two laser beams is typically small, because of which the absolute frequencies of the two laser beams are often not taken into consideration in conventional FMCW distance meters. However, this has the result that with a relative radial velocity greater than zero, a distance measurement error dependent on the relative radial movement of the target results. This so-called dynamic error, which is dependent on presently set frequency values of the first and the second frequency modulation, and/or on the curve of the tuned frequency values, can be reduced according to the invention by ensuring that the fundamental frequencies, on which the emission frequencies 1A, 1B are based, of the two laser beams are approximately equal, in particular wherein the two emission frequencies 1A, 1B are tuned relatively, especially mirror-symmetrically, in relation to a constant center frequency $v_c$.

In particular, according to the invention a simplified estimation term can be used for compensation of the dynamic error, which is only dependent on the frequency difference between the two oppositely-modulated emission frequencies 1A, 1B, so that a determination of absolute values for the emission frequencies 1A,1B can be omitted.

For example, in the case of a modulation of the emission frequencies 1A, 1B around a constant center frequency $v_c$, an estimation term can be derived which is dependent on a frequency difference of the modulated emission frequencies 1A, 1B from the center frequency $v_c$. The center frequency $v_c$ is often already known with sufficient accuracy based on the design, because of which it is thus sufficient according to the invention if, for a compensation of the dynamic error, only a relative frequency difference between the two oppositely-modulated emission frequencies 1A, 1B is determined and taken into consideration, instead of a determination of the absolute frequencies of the two emission beams.

Figure 3A:
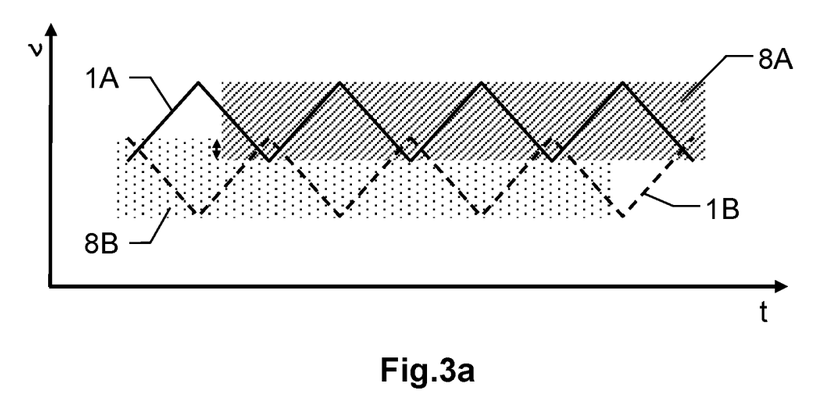
FIGS. 3a,b: show a schematic illustration of different frequency offsets between the first and the second modulation band.
Figure 3B:
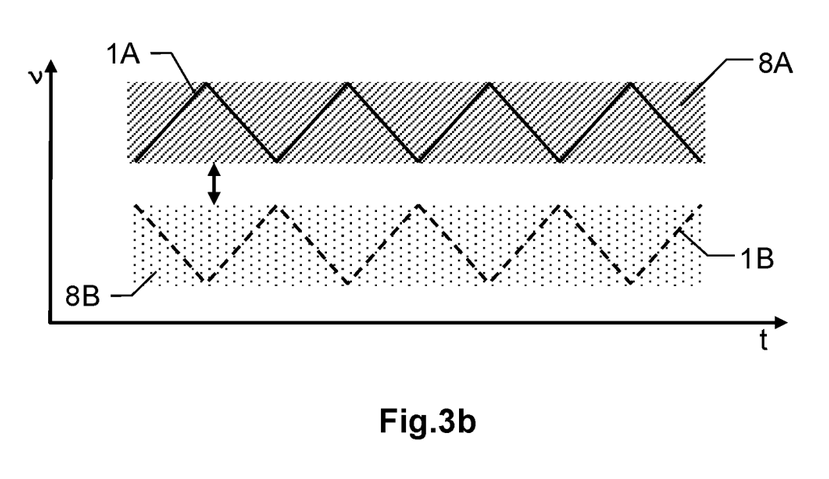

FIGS. 3a and 3b each schematically show the time dependence of oppositely-modulated emission frequencies 1A, 1B (FIG. 2) of an FMCW distance meter having opposing chirp, wherein different frequency offsets between the first modulation band 8A generated by the first frequency modulation and the second modulation band 8B generated by the second frequency modulation are shown.

The respective relative frequency curve of the emission frequencies 1A, 1B, i.e., the curve of the frequency changes of the emission frequencies 1A, 1B, can typically already be derived sufficiently accurately during operation from the control signals of the activation electronics of the signal generator and from the specifications of the laser source. In addition, various arrangements known from the prior art of reference interferometers can be used to compensate for nonlinearities during the generation of the frequency modulation or other effects corrupting the frequency curve.

This thus means that the emission frequencies 1A, 1B are each typically modulated within a defined modulation band 8A, 8B having typically known frequency bandwidth. An absolute frequency assignment to the respective modulation bands 8A, 8B of the emission frequencies 1A, 1B is usually only possible to a limited extent, however. For example, setting parameters of the activation electronics, ambient influences, for example, the temperature, or aging processes of individual components of the FMCW distance meter can change the absolute frequency reference of the emission frequencies 1A, 1B.

Therefore, a parameter is furthermore determined according to the invention which is indicative of a frequency offset between the two modulation bands 8A, 8B respectively defined by the modulation of the emission frequencies 1A, 1B. Based on this parameter, relative frequency differences between the two oppositely-modulated emission frequencies 1A, 1B are determined and taken into consideration by means of a simplified estimation term to compensate for the dynamic error in the FMCW distance measurement. In particular, a determination of the absolute frequencies of the two emission frequencies is thus not necessary according to the invention.

FIG. 3a shows a situation, wherein the frequency bands 8A, 8B still overlap. Thus, for example—as described with respect to FIG. 4—the intersection point in time of the two emission frequencies 1A, 1B can be determined as a parameter which is indicative of a frequency offset between the first and the second modulation band. The distance measuring method according to the present invention may also be applied to a situation according to FIG. 3b, however, wherein the two frequency bands 8A, 8B do not have an overlap.

Figure 4:
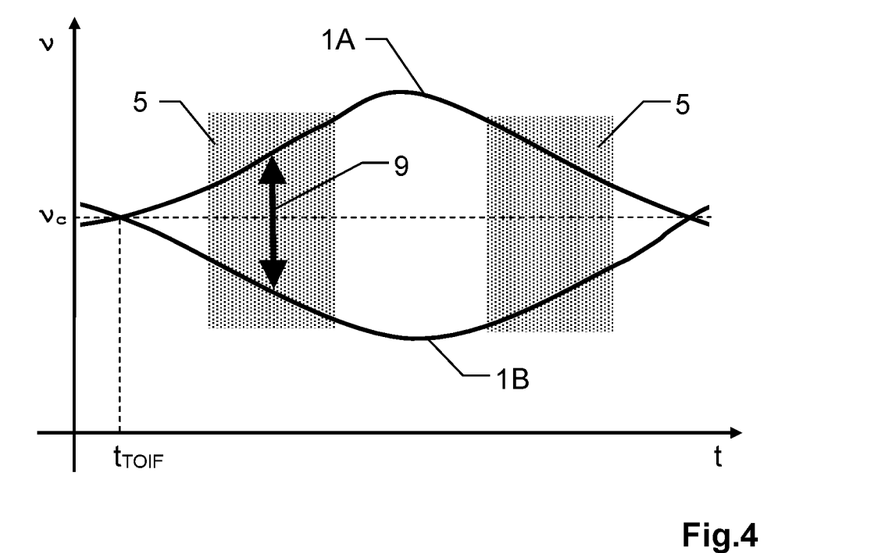
FIG. 4: shows a schematic illustration of the parameters of a compensation according to the invention of the dynamic error during an FMCW distance measurement having opposing chirp.

FIG. 4 shows schematic frequency tuning curves of two oppositely-modulated emission frequencies 1A, 1B in an FMCW distance measurement having opposing chirp and a compensation of the dynamic error according to the present invention. For the sake of simplicity, in this case the two emission frequencies 1A, 1B of the two laser beams are frequency-modulated by a signal generator essentially mirror-symmetrically in relation to a center frequency $v_c$. The dynamic error, which is dependent on the frequency values of the emission frequencies 1A, 1B of the two beam components and on the relative radial velocity of the target, is thus reduced.

As noted, the respective curve of the frequency changes of the emission frequencies 1A, 1B during the operation can typically already be derived sufficiently accurately from parameters of the distance meter and/or by means of measurement arrangements provided for this purpose and the emission frequencies 1A, 1B are each modulated within a defined modulation band 8A, 8B (FIG. 3a) typically having known frequency bandwidth. However, an absolute frequency assignment to the respective modulation bands of the emission frequencies 1A, 1B is usually only possible to a limited extent.

For example, a parameter is now determined according to the invention, however, by means of which a relative frequency difference 9 of the two emission frequencies 1A, 1B can be derived.

Figure 5:
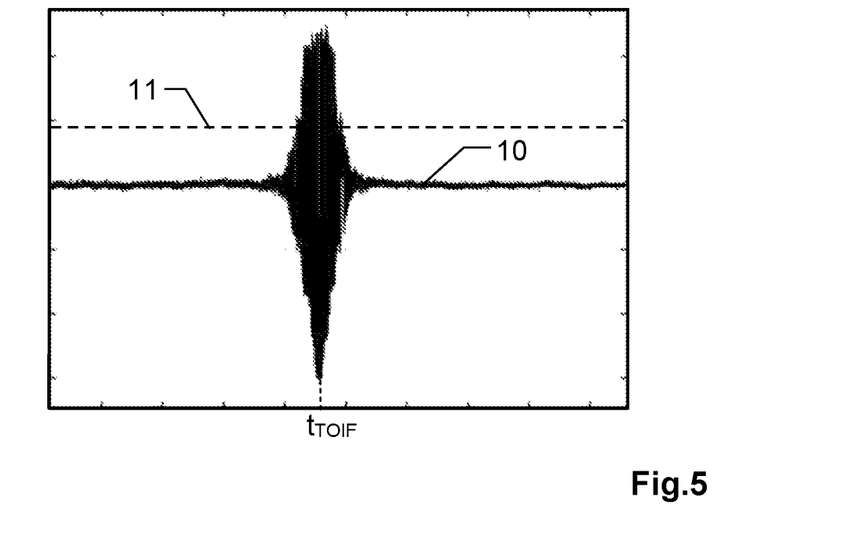
FIG. 5: shows a schematic illustration of an interferogram from an overlay of local oscillators of the two FMCW radiation components to determine the intersection point in time of the two radiation components.

For example, the two laser beams have the same frequency at an intersection point of the two emission frequencies 1A, 1B, wherein, for example, an interference signal 10 from an overlay of local oscillators of the two radiation components, as shown in FIG. 5, comprises a strong interference deflection at the intersection point in time and the point in time of the occurrence of the interference deflection $t_{TOIF}$ ("interference point in time") can be detected using relatively simple means, for example, based on a defined threshold value 11 for the interference signal 10.

Figure 6:
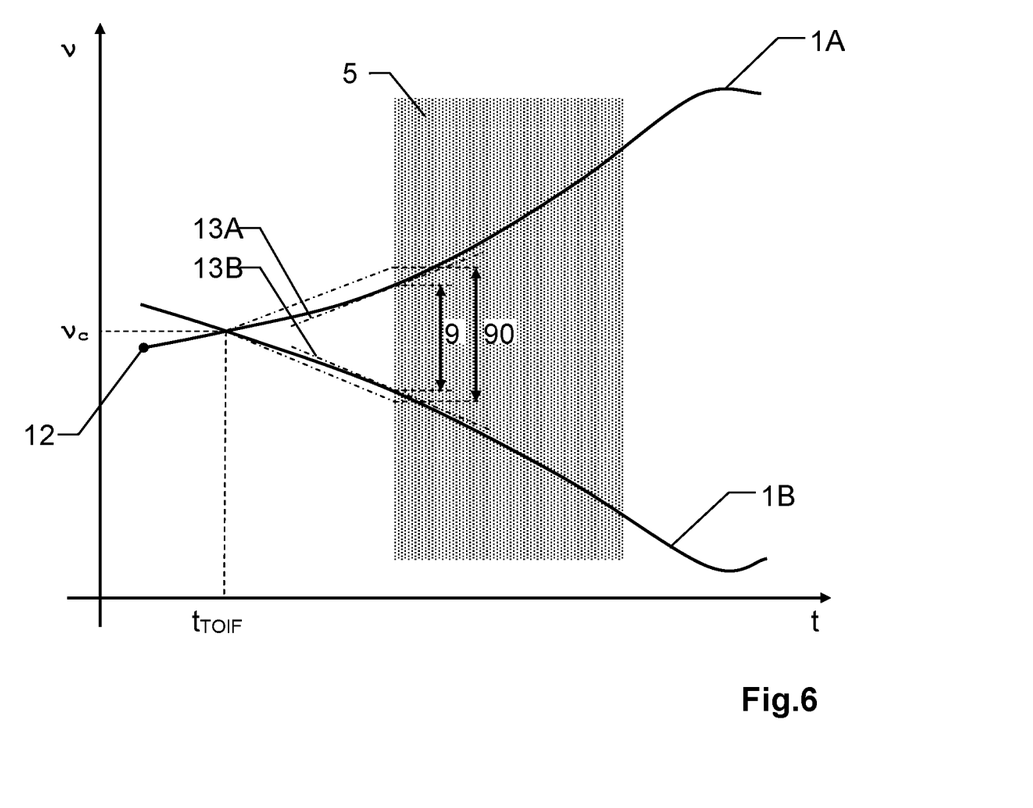
FIG. 6: shows an illustration of an exemplary measurement sequence for determining an approximated value for the frequency difference between the two FMCW laser beams.

FIG. 6 shows an exemplary measurement sequence, wherein the frequency of a first laser radiation generating the emission frequency 1A is tuned, so that the interference point in time $t_{TOIF}$ is in the vicinity of a frequency inflection point 12 of the first (or second) emission frequency 1A but outside the measurement interval 5. Because of the detected interference point of time $t_{TOIF}$, an unambiguous reference point is then known, at which the two emission frequencies 1A, 1B have the same frequency. The measurement interval 5 has, for example, a known time offset from the interference point $t_{TOIF}$, wherein the frequency difference between the emission frequencies 1A, 1B within the measurement interval is not equal to zero.

The actual frequency difference 9 between the two opposing emission frequencies 1A, 1B at a point in time within the measurement interval 5 can then be estimated, for example, by means of an approximated value 90 with respect to the interference point in time $t_{TOIF}$.

For example, the approximated value 90 is determined based on theoretical values, or values determined using a reference interferometer, of the frequency gradients 13A, 13B of the first and the second emission frequency 1A, 1B, and a linear approximation with respect to the interference point in time $t_{TOIF}$, in particular wherein the tuning of the laser beams within the measurement range 5 takes place essentially linearly.

It is obvious that these illustrated figures only schematically illustrate possible exemplary embodiments. The various approaches can also be combined with one another and with methods of the prior art.

The dynamic error and a possibility of deriving a simplified estimation term to compensate for the dynamic error may be mathematically described as follows, for example. However, it is self-evident that this mathematical description, which is solely by way of example, is not to be understood as restrictive to the invention in any way.

As described above, for example, with slope equal in absolute value of the frequency modulation in the rising and the falling ramp, the difference of the differential frequencies 6, 7 (see FIG. 2) between emission and reception frequencies is a distance measure, independent of the radial velocity.

For the sake of simplicity, a perfectly mirror-symmetrical triangular frequency modulation as shown in FIG. 2 is assumed hereafter. Upon an overlay of the respective frequencies of the rising ramp or the falling ramp with associated local oscillator signals each generated from the same radiation source, the interference frequencies thus generated, namely the interference frequency of the rising ramp $f_{TA}(t)$ and the interference frequency of the falling ramp $f_{TB}(t)$, can be allocated into a time-of-flight component $f_\tau$ and a Doppler component $f_{Doppler}$. For example, $f_{TA}(t)$ can be represented as $$f_{TA} = \underbrace{\frac{2}{\lambda_A(t)}\frac{d}{dt}r_T(t)}_{=:f_{Doppler}} - \underbrace{\frac{2r_T(t)}{\lambda_A^2(t)}\frac{d}{dt}\lambda_A(t)}_{=:f_\tau}$$

$$= \underbrace{v_T\frac{2}{\lambda_A(t)}}_{=:f_{Doppler}} + \underbrace{r_T(t)\frac{2}{c}\frac{d}{dt}v_A(t)}_{=:f_\tau}$$

wherein $r_T$ denotes the distance to the target, $v_T$ denotes the target velocity, C denotes the speed of light, and $\lambda_A(t)$ denotes the wavelength or $v_A(t)$ denotes the frequency of the laser beam, the first laser beam 1A here (FIG. 2). If $$\frac{d}{dt}v_A(t) = -\frac{d}{dt}v_S(t),$$

only the sign of the time-of-flight component changes for $f_{TB}(t)$.

The interference frequencies for the rising and the falling ramp may accordingly be written as $$f_{TA}(t) = v_T(t)\frac{2}{\lambda_A(t)} + r_T(t)\frac{2}{c}\frac{d}{dt}v_A(t)$$

$$f_{TB}(t) = v_T(t)\frac{2}{\lambda_B(t)} + r_T(t)\frac{2}{c}\frac{d}{dt}v_B(t)$$

whereby a system of linear equations is formed for the distance to the target $r_T$ and the target velocity $v_T$, wherein $\lambda_A, \lambda_B$ are the wavelengths or $v_A, v_B$ are the frequencies of the first and second laser beam 1A, 1B (FIG. 2). The following results therefrom for the distance to the target $$r_T(t) = \frac{c}{2} \frac{\lambda_A(t) f_{TA}(t) - \lambda_B(t) f_{TB}(t)}{\lambda_A(t) \frac{d}{dt} v_A(t) - \lambda_B(t) \frac{d}{dt} v_B(t)}$$

under the assumption that the variation of the wavelength is small, i.e., $\lambda \approx \lambda_A(t) \approx \lambda_B(t)$, a first estimation term $\hat{r}_T(t)$ can be derived for the distance to the target, i.e., $$\hat{r}_T(t) \overset{\lambda_A(t) \approx \lambda_B(t)}{=} \frac{c}{2} \frac{f_{TA}(t) - f_{TB}(t)}{\frac{d}{dt} v_A(t) - \frac{d}{dt} v_B(t)}$$

and it follows that $$\hat{r}_T(t) = r_T(t) + c \cdot v_T(t) \frac{\frac{1}{\lambda_A(t)} - \frac{1}{\lambda_B(t)}}{\frac{d}{dt} v_A(t) - \frac{d}{dt} v_B(t)}$$

This equation now shows that with a wavelength difference between the first and the second laser beam 1A, 1B, i.e., with $\lambda_A \neq \lambda_B$, in the case of a target velocity $v_T$ greater than zero, a dynamic error results, which is dependent on the frequency values/wavelength values of the first and the second laser beam 1A, 1B.

The above equation for $r_T$ can also be written as a function of the optical frequency instead of the optical wavelength, i.e., $$r_T(t) = \frac{c}{2} \frac{v_B(t) f_{TA}(t) - v_A(t) f_{TB}(t)}{v_B(t) \frac{d}{dt} v_A(t) - v_A(t) \frac{d}{dt} v_B(t)}$$

If the tuning of the frequency of the rising or the falling ramp, respectively, is parameterized based on a generally chronologically variable center frequency v(t), i.e., $$v_A(t) = v(t) + dv(t)$$

$$v_B(t) = v(t) - dv(t)$$

it thus follows that $$r_T(t) = \frac{c}{2} \frac{(v(t) - dv(t)) f_{TA}(t) - (v(t) + dv(t)) f_{TB}(t)}{(v(t) - dv(t)) \frac{d}{dt}(v(t) + dv(t)) - (v(t) + dv(t)) \frac{d}{dt}(v(t) - dv(t))}$$

$$= \frac{c}{4} \frac{\{f_{TA}(t) - f_{TB}(t)\} - \frac{dv(t)}{v(t)} \cdot \{f_{TA}(t) + f_{TB}(t)\}}{\frac{d}{dt}(dv(t)) - \frac{dv(t)}{v(t)} \frac{d}{dt}(v(t))}$$

If the first and the second laser radiation are now relatively tuned in relation to one another, the center frequency v(t) is thus constant and an improved second estimation term follows, which is dependent on the frequency difference dv(t) between the first and the second laser radiation and the center frequency v(t) or the center wavelength $\lambda$:

$$r_T(t) = \frac{c}{4} \frac{\{f_{TA}(t) - f_{TB}(t)\} - \frac{dv(t)}{v(t)} \cdot \{f_{TA}(t) + f_{TB}(t)\}}{\frac{d}{dt}(dv(t))}$$

$$= \hat{r}_T(t) - \frac{\lambda}{2} dv(t) \cdot \frac{f_{TA}(t) + f_{TB}(t)}{\frac{d}{dt} v_A(t) - \frac{d}{dt} v_B(t)}$$

This term represents an approximative correction for the previously estimated distance $\hat{r}_T(t)$, which does not require exact knowledge of the absolute wavelengths of the first and the second laser beam 1A, 1B. In this case, the center wavelength $\lambda$ is typically already known with sufficient accuracy because of the design and the task is thus to determine the frequency difference dv(t).

What is claimed is:

1. A distance measuring method comprising:
    generating a first and a second laser radiation, wherein
        the first laser radiation comprises a first frequency modulation defining a first modulation band, and
        the second laser radiation comprises a second frequency modulation defining a second modulation band, wherein a gradient of the first frequency modulation is different from a gradient of the second frequency modulation in at least some time intervals;
    simultaneously emitting at least a part of the first laser radiation and at least a part of the second laser radiation as the first or as the second emission radiation, respectively, toward the target;
    receiving at least a part of the first emission radiation returning from the target and at least a part of the second emission radiation returning from the target as the first or as the second reception radiation, respectively;
    generating a first and a second mixed signal based on a mixture of the first reception radiation with a first local oscillator radiation or based on a mixture of the second reception radiation with a second local oscillator radiation, respectively, for a distance measurement according to the principle of a frequency-modulated continuous wave radar; and
    determining at least one distance to the target based on the first and the second mixed signal,
    wherein:
        a parameter is determined, which is indicative of a frequency offset between the first and the second modulation band, and
        the parameter is taken into consideration during the determination of the at least one distance to the target to derive a frequency difference between the first frequency modulation and the second frequency modulation.

2. The distance measuring method according to claim 1, wherein the second frequency modulation comprises at least one time interval having a modulation direction opposing the modulation direction of the first frequency modulation.

3. The distance measuring method according to claim 1, wherein the parameter is an intersection point in time, at which the first and the second frequency modulation have the same frequency.

4. The distance measuring method according to claim 3, wherein the intersection point in time is determined from an interference curve of an overlay of at least a part of the first laser radiation and at least a part of the second laser radiation.

5. The distance measuring method according to claim 1, wherein:
   a referencing of the frequency curve of the first and/or the second frequency modulation is carried out with respect to a reference parameter of a reference interferometer, and
   nonlinearities during the generation of the first and/or the second frequency modulation are compensated for based on the referencing during the determination of the at least one distance.

6. The distance measuring method according to claim 1, wherein the frequency difference between the first and the second frequency modulation is determined based on the parameter, which is indicative of a frequency offset between the first and the second modulation band, and a first curve parameter with respect to the first frequency modulation and a second curve parameter with respect to the second frequency modulation.

7. The distance measuring method according to claim 1, wherein the determination of the at least one distance takes place during a measurement interval, wherein the measurement interval and the first and the second frequency modulation are adapted to one another in such a way that the first and the second emission radiation each comprise an essentially linear frequency modulation during the measurement interval.

8. A distance meter comprising:
   a laser radiation source configured for generating a first and a second laser radiation, wherein:
     the first laser radiation comprises a first frequency modulation defining a first modulation band, and
     the second laser radiation comprises a second frequency modulation defining a second modulation band, wherein a gradient of the first frequency modulation is different from a gradient of the second frequency modulation in at least some time intervals,
       i. an emission path configured for simultaneously emitting at least a part of the first laser radiation and at least a part of the second laser radiation as the first or as the second emission radiation, respectively, toward the target,
       ii. a receiver configured for receiving at least a part of the first emission radiation returning from the target and at least a part of the second emission radiation returning from the target as the first or as the second reception radiation, respectively,
       iii. a mixer configured for generating a first and a second mixed signal based on a mixture of the first reception radiation with a first local oscillator radiation or based on a mixture of the second reception radiation with a second local oscillator radiation, respectively, for a distance measurement according to the principle of a frequency-modulated continuous wave radar, and
       iv. a processing unit configured for determining at least one distance to the target based on the first and the second mixed signal,
   wherein the processing unit is configured to determine a parameter, which is indicative of a frequency offset between the first and the second modulation band, and to take the parameter into consideration during the determination of the at least one distance to the target to derive a frequency difference between the first frequency modulation and the second frequency modulation.

9. The distance meter according to claim 8, wherein the second frequency modulation comprises at least one time interval having a modulation direction opposing the modulation direction of the first frequency modulation.

10. The distance meter according to claim 8, wherein the parameter is an intersection point in time, at which the first (1A) and the second (1B) frequency modulation have the same frequency.

11. The distance meter according to claim 10, wherein:
   the distance meter comprises an interferometer arrangement, configured to generate an interference curve of an overlay of at least a part of the first laser radiation and at least a part of the second laser radiation, and
   the processing unit is configured to determine the intersection point in time from the interference curve.

12. The distance meter according to claim 11, wherein:
   a threshold value for the interference signal strength of the interference curve is stored on the processing unit, and the intersection point in time is determined based on the threshold value and the interference curve.

13. The distance meter according to claim 8, wherein:
   the distance meter comprises a reference interferometer, which is configured to carry out a referencing of the frequency curve of the first or second frequency modulation with respect to a reference parameter of the reference interferometer, and
   the processing unit is configured to compensate for nonlinearities during the generation of the first or the second frequency modulation based on the referencing during the determination of the at least one distance.

14. The distance meter according to claim 8,
   a first curve parameter with respect to the first frequency modulation and a second curve parameter with respect to the second frequency modulation are stored on the processing unit, and
   the processing unit is configured to determine the frequency difference between the first and second frequency modulation based on the parameter, which is indicative of a frequency offset between the first and second modulation band, and also the first and second curve parameter.

15. The distance meter according to claim 8, wherein the distance meter is configured:
   to determine a third curve parameter with respect to the first frequency modulation and a fourth curve parameter with respect to the second frequency modulation, and
   to determine the frequency difference between the first and second frequency modulation based on the parameter, which is indicative of a frequency offset between the first and second modulation band, and also the third and the fourth curve parameter.

* * * * *